United States Patent [19]

Weller et al.

[11] Patent Number: 5,861,474
[45] Date of Patent: Jan. 19, 1999

[54] POLYMER DEVOLATILIZATION

[75] Inventors: Joseph P. Weller; Lawrence D. Wilson; Michele L. Rosenau; Pat Jimenez; Bernard M. Lescure, all of Lake Jackson, Tex.

[73] Assignee: The Dow Chemical Company, Midland, Mich.

[21] Appl. No.: 685,314

[22] Filed: Jul. 23, 1996

[51] Int. Cl.[6] .................................................. C08F 6/10
[52] U.S. Cl. ......................... 528/501; 528/481; 528/483; 528/498; 528/502 C; 528/503; 159/47.1; 159/DIG. 4; 159/DIG. 16
[58] Field of Search ................................. 528/501, 483, 528/502 C, 481, 498, 503; 159/47.1

[56] References Cited

U.S. PATENT DOCUMENTS

| | | | |
|---|---|---|---|
| 3,373,148 | 3/1968 | Mackie et al. | 260/87.3 |
| 3,683,511 | 8/1972 | Johnson et al. | 34/9 |
| 3,738,409 | 6/1973 | Skidmore | 159/2 E |
| 3,799,235 | 3/1974 | Moosavian et al. | 159/3 |
| 3,917,507 | 11/1975 | Skidmore | 159/2 E |
| 3,920,624 | 11/1975 | Humkey et al. | 260/94.9 F |
| 3,931,130 | 1/1976 | Beining | 260/88.2 |
| 3,963,558 | 6/1976 | Skidmore | 159/2 E |
| 3,987,235 | 10/1976 | Fujimoto | 528/481 |
| 4,094,942 | 6/1978 | Nakai et al. | 264/102 |
| 4,195,169 | 3/1980 | Priddy | 528/500 |
| 4,258,158 | 3/1981 | Pfeiffer | 526/68 |
| 4,372,758 | 2/1983 | Bobst et al | 55/48 |
| 4,501,885 | 2/1985 | Sherk et al. | 528/501 |
| 4,578,455 | 3/1986 | Pipper et al. | 528/501 |
| 4,686,279 | 8/1987 | Nagtzaam et al. | 528/501 |
| 4,703,105 | 10/1987 | Allada | 528/483 |
| 4,842,743 | 6/1989 | Yoshida et al. | 210/634 |
| 4,906,329 | 3/1990 | Tominari et al. | 159/47.1 |
| 4,921,678 | 5/1990 | Raufast | 422/110 |
| 4,952,672 | 8/1990 | Moore et al. | 528/481 |
| 5,071,950 | 12/1991 | Borho et al. | 528/483 |
| 5,080,845 | 1/1992 | Herrmann et al. | 264/101 |
| 5,084,134 | 1/1992 | Mattiussi et al. | 159/47.1 |
| 5,407,974 | 4/1995 | Dallmeyer | 523/328 |
| 5,453,158 | 9/1995 | Cummings et al. | 159/47.1 |

FOREIGN PATENT DOCUMENTS

| | | |
|---|---|---|
| 0 583 082 A | 2/1994 | European Pat. Off. . |
| 0 584 926 A | 3/1994 | European Pat. Off. . |
| 0 798 314 A | 10/1997 | European Pat. Off. . |
| 2223022 A | 9/1988 | United Kingdom . |
| PCT/US92/ 01720 | 4/1991 | WIPO . |

OTHER PUBLICATIONS

"Polymer Devolatilization," Todd, 32 Annual Tech. Conf., SPE, 1974, pp. 472–475.

"Advances In Devolatilizing Extrusin Techniques," 31st Annual Tech. Conf., SPE, 1973, pp. 263–268.

"Slit Devolatilization of Polymers," Maffetone et al, AI Ch E Journal, May 91, vol. 37, No. 5, pp. 724–734.

"Polymer Melt Devolatilization: On Equipment Designs Equations," Biesenberger, Advances In Polymer Technology, vol. 7, No. 3, 1987, pp. 267–278.

"Sulzer SMX Mixers For The Plastics Production Industry," Gebruder Sulzer Aktiengesellschaft, Mar. 1993.

"Advances In Static Mixing Technology," CEP, Jul. 1986, p. 48.

"Devolatilization of Polymers," Ed. Biesenberger, Hansen Publishers, 1983, pp. 3–31, 35–50.

"Solubilities of Ethylene and Other Organic Solutes in Liquid, Low–Density Polyethylene in the Region 124° to 300° C," Maloney et al, AI Ch E Journal, vol. 22, No. 1, 1976, pp. 74–82.

"Solubility of Nitrogen and Ethylene In Molten Low–Density Polyethylene to 69 Atmospheres," Cheng et al, Journal of Polymer Science, vol. 16, 1978, pp. 319–333.

"Thermodynamics of Gas Solubilities in Molten Polymers," Liu et al, Journal of Applied Polymer Science, vol. 24, 1979 pp. 725–733.

Int'l Search Report, PCT/US97/12288, filed Sep. 7, 1997, counterpart of this case U.S. 08/685,314 and coowned therewith.

"Advances In Static Mixing Technology," Chemical Engineering Progress, Jul. 1986, pp. 42–48.

*Primary Examiner*—Fred Teskin

[57] ABSTRACT

A process has been invented for removing contaminants (including solvent) from a flowing polymer, the process, in one aspect, including dissolving a sparingly soluble stripping agent into a flowing polymer, the sparingly soluble stripping agent stripping contaminants from the flowing polymer creating a mixture of contaminants and sparingly soluble stripping agent, which flows out from the flowing polymer, and separating the mixture from the polymer. In one aspect, recyclable sparingly soluble stripping agent is recovered and re-used.

22 Claims, 1 Drawing Sheet ical practice complete polymerization is never achieved and the resulting polymer has a variety of volatile contaminants, including unreacted monomer, solvent, and oligomers. Typically such contaminants are volatile relative to the polymer which is nonvolatile.

POLYMER DEVOLATILIZATION

BACKGROUND OF THE INVENTION

1. Field of the Invention

This invention is directed to polymer devolatilization and, in certain aspects, to the use of a sparingly soluble stripping agent to significantly reduce the level of volatile contaminants in a flowing polymer.

2. Description of Related Art

Ideally solution polymerization would result in one hundred percent complete polymerization of monomer. In actual practice complete polymerization is never achieved and the resulting polymer has a variety of volatile contaminants, including unreacted monomer, solvent, and oligomers. Typically such contaminants are volatile relative to the polymer which is nonvolatile.

Residual monomer and other volatile contaminants in a product polymer may have an undesirable effect on polymer quality.

There has long been a need for improved methods for more efficient and effective polymer devolatilization. There has long been a need for such a method which avoids problems associated with the use of water as a stripping agent. There has long been a need for such a process which achieves very low volatile levels in a relatively short time, and with relatively small power requirements.

SUMMARY OF THE PRESENT INVENTION

The present invention discloses processes for removing volatile contaminants from a flowing polymer. In one aspect the process includes making a flowing polymer-solvent solution and then dissolving therein a sparingly soluble stripping agent ("SSSA") (e.g., but not limited to, an agent such a $N_2$, $C_2H_4$, $CH_4$, and $H_2$; and, preferably an agent with certain solubility level, e.g. with a weight fraction Henry's constant of more than 500 ATM.). The solubility of a gas in a polymer at pressure P is conveniently expressed by the weight-fraction Henry's constant $$H_{1,2}^{(P)} = \lim_{w1 \to 0} \frac{f_1}{w_1}$$

where subscripts 1 and 2 represent solute and polymer, respectively; f stands for fugacity; and w is the weight fraction in the polymer phase. Stripping creates a mixture of SSSA, solvent, and volatile contaminants stripped from the flowing polymer-solvent solution by the SSSA. Then the mixture is separated from the flowing polymer. Preferably the combined polymer, solvent and SSSA are single phase. In certain aspects the polymer is polystyrene, styrene copolymers, ethylene styrene interpolymer, low density polyethylene (LDPE), high density polyethylene (HDPE), linear low density polyethylene (LLDPE), or ethylene alpha-olefin interpolymers.

In one aspect, the SSSA is dissolved into the flowing polymer stream under sufficient controlled pressure; e.g., but not limited to 250 pounds per square inch gauge (psig) or greater and, in certain aspects, 500 psig or greater, e.g., up to 4500 psig.

In one aspect, polymer is foamed under controlled vacuum conditions to facilitate separation from the mixture of SSSA and contaminants; e.g., but not limited to 5 to 25 mm Hg. Foaming may be accomplished with any known effective foaming device such as a flashing heat exchanger.

Further treatment of the mixture of SSSA and contaminants results in an amount of recyclable SSSA. For example, the mixture is cooled and compressed and then contaminants are condensed to recover reusable SSSA which is reinjected into contaminated flowing polymer. Thus problems associated with remixing of contaminated SSSA with polymer are avoided.

In certain preferred processes according to the present invention, the level of volatile contaminants in an amount of polymer is reduced to at most one hundred parts per million by weight and, in certain aspects, to at most fifty parts per million by weight and in other embodiments to at most eight parts per million by weight. In certain preferred processes, such contaminant levels are achieved in a relatively short time; in one aspect in at most about fifteen minutes residence time in a mixer; or in sufficient time to dissolve the SSSA and polymer. In certain aspects the solution is effected in seven minutes or less.

In certain preferred processes according to the present invention, the SSSA is broken into relatively small droplets (e.g. droplets with a largest dimension equal to or less than one millimeter; equal to or less than 0.4 mm; or equal to or less than 0.1 mm) to facilitate dissolution in the polymer. Also, it is possible to use relatively smaller amounts of SSSA (as compared to processes using water) to achieve similar or better polymer contaminant levels, due, in part, to solution of SSSA in the polymer.

In one aspect, a process according to the present invention is a "falling strand" or "falling foam" operation requiring no moving parts in a devolatilizer vessel, producing a significant reduction in power requirements as compared to certain stripping extruders and requiring reduced capital outlay. Since water is not used, no additional clean-up is required to strip residual organic contaminants from water. In one aspect, SSSA and contaminated polymer are preflashed (within the vessel and/or immediately prior to the vessel) producing a two-phase mixture which is introduced into a devolatilizer vessel.

In one aspect of processes according to the present invention, SSSA's are employed for the dual purpose of increasing polymer surface area (promoting maximum mass transfer) and of reducing partial pressure of residual volatiles to maximize thermodynamic driving force for the separation of volatiles from the polymer.

The present invention, in certain aspects, is directed to the production of a variety of polymers, including but not limited to thermoplastic polymer compositions containing polystyrene, polyethylene, acrylic plastic resins, epoxy resins, polypropylene, and, polyolefins. In certain aspects useful stripping agents include, but are not limited to $N_2$, $C_2H_4$, $CH_4$, $CO_2$, and hydrocarbons having one or two carbon atoms, and mixtures of two or more of these.

It is, therefore, an object of at least certain preferred embodiments of the present invention to provide:

New, useful, unique, efficient, nonobvious methods for devolatilizing a polymer with a sparingly soluble stripping agent;

Such a method in which SSSA separated from a treated polymer is recycled to treat additional polymer;

Such a method in which polymer volatile contaminant levels are reduced to fifty parts per million or less, and preferably to twenty-five parts per million or less, and most preferably to eight parts per million or less;

Such a method that avoids the problems associated with the use of water as a stripping agent;

Such methods in which a relatively small amount of stripping agent is needed;

Such a method in which the SSSA both increases surface area of flowing polymer and reduces partial pressure of solvent to facilitate decontamination; and Such a method in which low levels of polymer volatile contaminants are achieved without significant polymer degradation, with low shear heating, low work input into the polymer, and in a relatively short time, e.g. fifteen minutes or less.

Certain embodiments of this invention are not limited to any particular individual feature disclosed here, but include combinations of them distinguished from the prior art in their structures and functions. Features of the invention have been broadly described so that the detailed descriptions that follow may be better understood, and in order that the contributions of this invention to the arts may be better appreciated. There are, of course, additional aspects of the invention described below and which may be included in the subject matter of the claims to this invention. Those skilled in the art who have the benefit of this invention, its teachings, and suggestions will appreciate that the conceptions of this disclosure may be used as a creative basis for designing other structures, methods and systems for carrying out and practicing the present invention. The claims of this invention are to be read to include any legally equivalent devices or methods which do not depart from the spirit and scope of the present invention.

The present invention recognizes and addresses the previously-mentioned problems and long-felt needs and provides a solution to those problems and a satisfactory meeting of those needs in its various possible embodiments and equivalents thereof. To one of skill in this art who has the benefits of this invention's realizations, teachings, disclosures, and suggestions, other purposes and advantages will be appreciated from the following description of preferred embodiments, given for the purpose of disclosure, when taken in conjunction with the accompanying drawings. The detail in these descriptions is not intended to thwart this patent's object to claim this invention no matter how others may later disguise it by variations in form or additions of further improvements.

BRIEF DESCRIPTION OF THE DRAWINGS

A more particular description of embodiments of the invention briefly summarized above may be had by references to the embodiments which are shown in the drawings which form a part of this specification. These drawings illustrate certain preferred embodiments and are not to be used to improperly limit the scope of the invention which may have other equally effective or legally equivalent embodiments.

DESCRIPTION OF EMBODIMENTS PREFERRED AT THE TIME OF FILING FOR THIS PATENT

Figure 1:
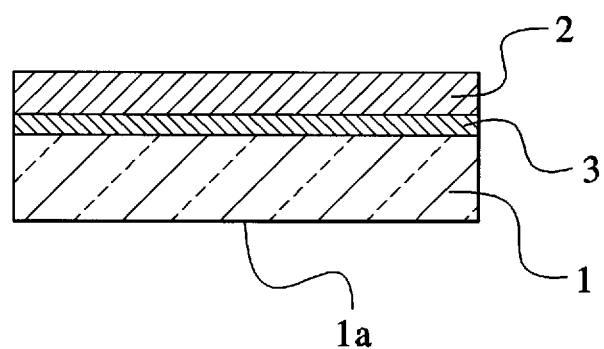
FIG. 1 is a schematic illustration of a system for practicing a method according to the present invention.

FIG. 1 shows a system 10 useful in a method according to the present invention for producing a product polymer (e.g. but not limited to polystyrene or polyethylene, e.g. LDPE, LLDPE, or HDPE). Polymer at a temperature of from 150° to 300° C. and under pressure (e.g. 1500 psig) flows in a line 12 to contact in a line 16 a sparingly soluble stripping agent ("SSSA") flowing in a line 14. A resulting mixture of polymer and SSSA flows in a line 16 into and is sheared in a mixer 20 (e.g. a commercially available mechanical mixer or static mixer to produce bubbles of SSSA in the mixture. A number of high pressure injection valves may be used at the junction of the lines 12 and 14 to more evenly distribute SSSA radially into the polymer.

A pressure source 30 (e.g. a pump) and a control valve 17 control the pressure (e.g. between 1500 and 500 psig) so that, preferably, between about 0.05 to about 0.5 weight percent of the SSSA is forced into solution in the flowing polymer. Preferably the residence time of the polymer between the point at which it is mixed with the SSSA and the control valve 17 is between one minute and thirty minutes. Initially the control valve 17 is opened and the polymer mixed with SSSA flows into a vessel 40 through a distributor 42. Vessel 40 is preferably operated at a pressure less than 50 mm Hg absolute which is maintained by a vacuum system or by a valve in the line 22. A vacuum system 50 with a compressor 60 removes vapor containing SSSA and volatiles from the vessel 40 through a line 22. The removed vapor is introduced through a line 24 to the compressor 60. Volatile contaminants condensed in the compressor 60 through a line 26. Compressed SSSA formed by compression in the compressor is forwarded from the compressor via flow line 28 and the majority of the SSSA may be recycled back into the flowing polymer via the lines 28 and 14. Injection pressure is controlled by a two-way valve 70 in line 14. This may feed back to the suction of the compressor.

Product polymer is removed from the vessel 40 by a pump 80 and flows out in a flow line 34.

When the product polymer is LLDPE and the SSSA is $N_2$, the amount of $N_2$ is preferably less than or equal to 0.5 weight percent so that foaming of the majority of the polymer-SSSA mixture occurs in the distributor 42. SSSA contaminants (and a small amount of SSSA) exit through a line 32. Fresh SSSA (preferably oxygen-free) may be added as needed in a line 29.

Table I presents data from the production of LLDPE using nitrogen as the SSSA.

TABLE 1

| | Melt Temp C.° | Feed Solvent Conc (ppm by weight) | Product Solvent Conc (ppm by weight) | Injection Point Pressure Psig | Control Point Pressure Psig | $N_2$ Stripping Level Wt % in polymer | Vessel Pressure mm Hg Absolute |
|---|---|---|---|---|---|---|---|
| 1. | 225° C. | 1100 | 11 | 1629 | 767 | 0.5% | 11.2 mm |
| 2. | 225° C. | 1100 | 32 | 1587 | 753 | 0.5% | 28.2 mm |
| 3. | 225° C. | 1100 | 32 | 1561 | 740 | 0.75% | 30.1 mm |
| 4. | 225° C. | 1100 | 8 | 1547 | 738 | 1.0% | 10.8 mm |
| 5. | 225° C. | 1100 | 32 | 905 | 473 | .75% | 20.7 mm |
| 6. | 225° C. | 1100 | 29 | 635 | 293 | 0.5% | 10.7 mm |
| 7. | 225° C. | 1100 | 67 | 673 | 308 | 0.5% | 27.1 mm |
| 8. | 225° C. | 1100 | 64 | 625 | 285 | 1.0% | 30.6 mm |
| 9. | 225° C. | 1100 | 25 | 596 | 270 | 1.0% | 10.9 mm |

TABLE 1-continued

| | Melt Temp C.° | Feed Solvent Conc (ppm by weight) | Product Solvent Conc (ppm by weight) | Injection Point Pressure Psig | Control Point Pressure Psig | $N_2$ Stripping Level Wt % in polymer | Vessel Pressure mm Hg Absolute |
|---|---|---|---|---|---|---|---|
| 10. | 225° C. | 1100 | 41 | 1605 | 721 | .3% | 15.8 mm |
| 11. | 225° C. | 1100 | 83 | 1520 | 699 | .2% | 37.4 mm |

"Melt Temp °C." is the temperature of the polymer flowing in line 12, FIG. 1. "Feed Solvent Conc (ppm)" is the level, in parts per million by weight, of undesirable volatile contaminants (e.g. but not limited to a mixture of $C_8$ and $C_9$ alkanes) in the line 12. "Product Solvent Conc (ppm)" is the level of all volatile contaminants in the line 34. "Injection Point Pressure" is the pressure in line 16 at the mixture point. "Control Point Pressure" is the pressure in psig immediately in front of the valve 17. "$N_2$ stripping Level wt %" is the weight percent of $N_2$ in line 16. "Vessel Pressure" is pressure in mm of Hg absolute. Table I indicates that 99% or more of the volatile contaminants (including solvent) are removed from the flowing polymer-agent solution.

In conclusion, therefore, it is seen that the present invention and the embodiments disclosed herein and those covered by the appended claims are well adapted to carry out the objectives and obtain the ends set forth. Certain changes can be made in the subject matter without departing from the spirit and the scope of this invention. It is realized that changes are possible within the scope of this invention and it is further intended that each element or step recited in any of the following claims is to be understood as referring to all equivalent elements or steps. The following claims are intended to cover the invention as broadly as legally possible in whatever form it may be utilized. The invention claimed herein is new and novel in accordance with 35 U.S.C. § 102 and satisfies the conditions for patentability in § 102. The invention claimed herein is not obvious in accordance with 35 U.S.C. § 103 and satisfies the conditions for patentability in § 103. This specification and the claims that follow are in accordance with all of the requirements of 35 U.S.C. § 112.

What is claimed is:

1. A process for removing contaminants from a flowing polymer, the process comprising:
   (a) making a flowing stream of polymer-solvent solution having an initial level of contaminants,
   (b) introducing the flowing stream of polymer-solvent solution and a sparingly soluble stripping agent with a Henry's constant of more than 500 atmospheres into a mixer,
   (c) applying a pressure of from 250 to 4500 psig to the mixer to form a polymer-solvent/sparingly soluble stripping agent mixture,
   (d) foaming under a vacuum the polymer-solvent/sparingly soluble stripping agent mixture, whereby a mixture of contaminants including solvent and sparingly soluble stripping agent is stripped from the polymer-solvent/sparingly soluble stripping agent mixture, and
   (e) separating the mixture of contaminants from the polymer-solvent/sparingly soluble stripping agent mixture to form a product polymer having a final level of contaminants,
   wherein the process is conducted at a temperature of from 150° to 300° C.

2. The process of claim 1 wherein the final level of contaminants including solvent is at most 50 parts per million by weight.

3. The process of claim 1 wherein the final level of contaminants including solvent is at most 25 parts per million by weight.

4. The process of claim 1 wherein the final level of contaminants including solvent is at most 8 parts per million by weight.

5. The process of claim 1 wherein the initial level of contaminants is at least 1000 parts per million by weight and the process produces a product polymer with a final level of contaminants of at most 50 parts per million by weight.

6. The process of claim 1 further comprising
   (f) separating the sparingly soluble stripping agent from the mixture of contaminants to form recyclable sparingly soluble stripping agent, and
   (g) introducing the recyclable sparingly soluble stripping agent into the flowing polymer-solvent solution.

7. The process of claim 1 wherein the polymer is polyethylene.

8. The process of claim 7 wherein, the process further comprising the following step:
   prior to the introducing of the flowing stream of the polymer-solvent solution and the sparingly soluble stripping agent into the mixer of step (b), forming under a controlled pressure a mixture of the flowing stream of the polymer-solvent solution and the sparingly soluble stripping agent.

9. The process of claim 7 wherein the residence time within the mixer is at most 15 minutes.

10. The process of claim 1, wherein the foaming of step (d) is conducted under a vacuum ranging between 5 and 25 mm Hg.

11. The process of claim 1 wherein at least 99% of the solvent and sparingly soluble stripping agent, are removed from the polymer-solvent/sparingly soluble stripping agent mixture.

12. The process of claim 1 which is conducted without water.

13. The process of claim 1 wherein the sparingly soluble stripping agent is broken into bubbles with a largest dimension equal to or less than 1 millimeter, to facilitate dissolution in the flowing polymer.

14. The process of claim 1 conducted in a falling foam devolatilizer system in a devolatilizer vessel without moving parts therein.

15. The process of claim 14, further comprising
   preflashing the polymer solvent solution within the devolatilizer vessel or prior to introducing it into the devolatilizer vessel.

16. The process of claim 1 wherein the polymer is selected from the group consisting of polystyrene, styrene copolymers, ethylene styrene interpolymer, polyethylene, acrylic plastic resins, epoxy resins, polypropylene, and polyolefins, and the sparingly soluble stripping agent is selected from the group consisting of nitrogen, ethylene, methane, and hydrogen.

17. The process of claim 14 wherein the polymer-solvent solution and the sparingly soluble stripping agent are contacted together at a point of contact, and wherein the residence time between the point of contact and the foaming of step (e) is from one to thirty minutes.

18. The process of claim 1 wherein the sparingly soluble stripping agent both increases surface area of the flowing polymer and reduces partial pressure of the solvent.

19. The process of claim 14 wherein the devolatilizer vessel operates at less than 500 mm Hg absolute.

20. A process for removing contaminants from a flowing polymer, the process comprising
   (a) making a flowing polymer-solvent solution having an initial level of contaminants,
   (b) introducing the flowing stream of polymer-solvent solution and a sparingly soluble stripping agent with a Henry's constant of more than 500 atmospheres into a mixer, wherein the sparingly soluble stripping agent is broken into bubbles with a largest dimension equal to or less than 1 millimeter, to facilitate dissolution in the flowing stream of polymer-solvent solution, such as to produce a polymer-solvent/sparingly soluble stripping agent mixture,
   (c) foaming under a vacuum the polymer-solvent/sparingly soluble stripping agent mixture, whereby a mixture of contaminants including solvent and sparingly soluble stripping agent is stripped from the polymer-solvent/sparingly soluble stripping agent mixture, and
   (d) separating the mixture of contaminants from the polymer-solvent/sparingly soluble stripping agent mixture to form a product polymer having a final level of contaminants,
   wherein the process is conducted at a temperature of from 150° to 300° C.

21. A process for removing contaminants from a flowing polymer, the process comprising
   (a) making a flowing stream of polymer-solvent solution having an initial level of contaminants,
   (b) introducing the flowing stream of polymer-solvent solution and a sparingly soluble stripping agent into a mixer, such as to produce a polymer-solvent/sparingly soluble stripping agent mixture,
   (c) foaming under a vacuum the polymer-solvent/sparingly soluble stripping agent mixture, whereby a mixture of contaminants including solvent and sparingly soluble stripping agent is stripped from the polymer-solvent/sparingly soluble stripping agent mixture, and
   (d) separating the mixture of contaminants from the polymer-solvent/sparingly soluble stripping agent mixture to form a product polymer having a final level of contaminants which is at most 50 parts per million by weight,
   wherein the process is conducted at a temperature of from 150° to 300° C.

22. The process of claim 21 wherein the sparingly soluble stripping agent is an agent with a Henry's Constant of more than 500 atmospheres.

* * * * *

UNITED STATES PATENT AND TRADEMARK OFFICE
CERTIFICATE OF CORRECTION

PATENT NO. : 5,861,474

DATED : January 19, 1999

INVENTOR(S) : Joseph P. Weller; Lawrence D. Wilson; Michele L. Rosenau; Pat Jimenez; Bernard M. Lescure It is certified that error appears in the above-indentified patent and that said Letters Patent is hereby corrected as shown below:

Fig. 1 Should Read as Follows:

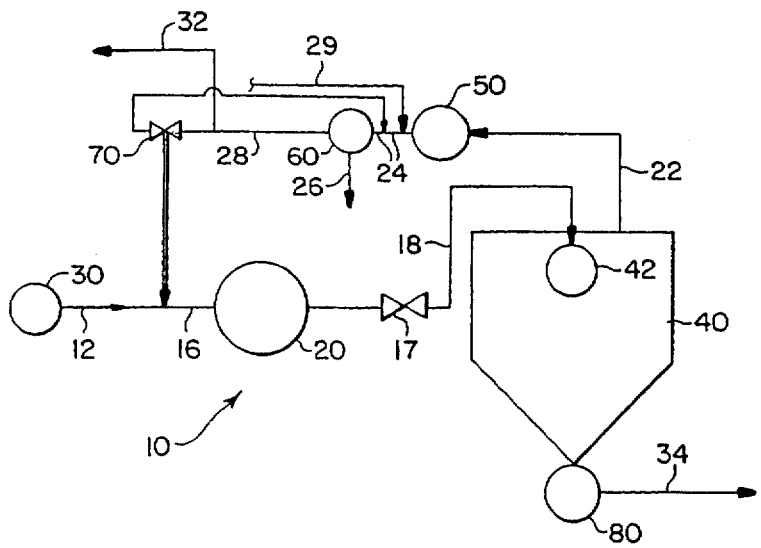

Signed and Sealed this

Twenty-sixth Day of October, 1999

Attest:

Q. TODD DICKINSON

Attesting Officer     Acting Commissioner of Patents and Trademarks